Feb. 20, 1962  J. N. SCOTT, JR  3,021,568
INJECTION MOLDING OF PLASTIC MATERIALS
Filed Oct. 15, 1958
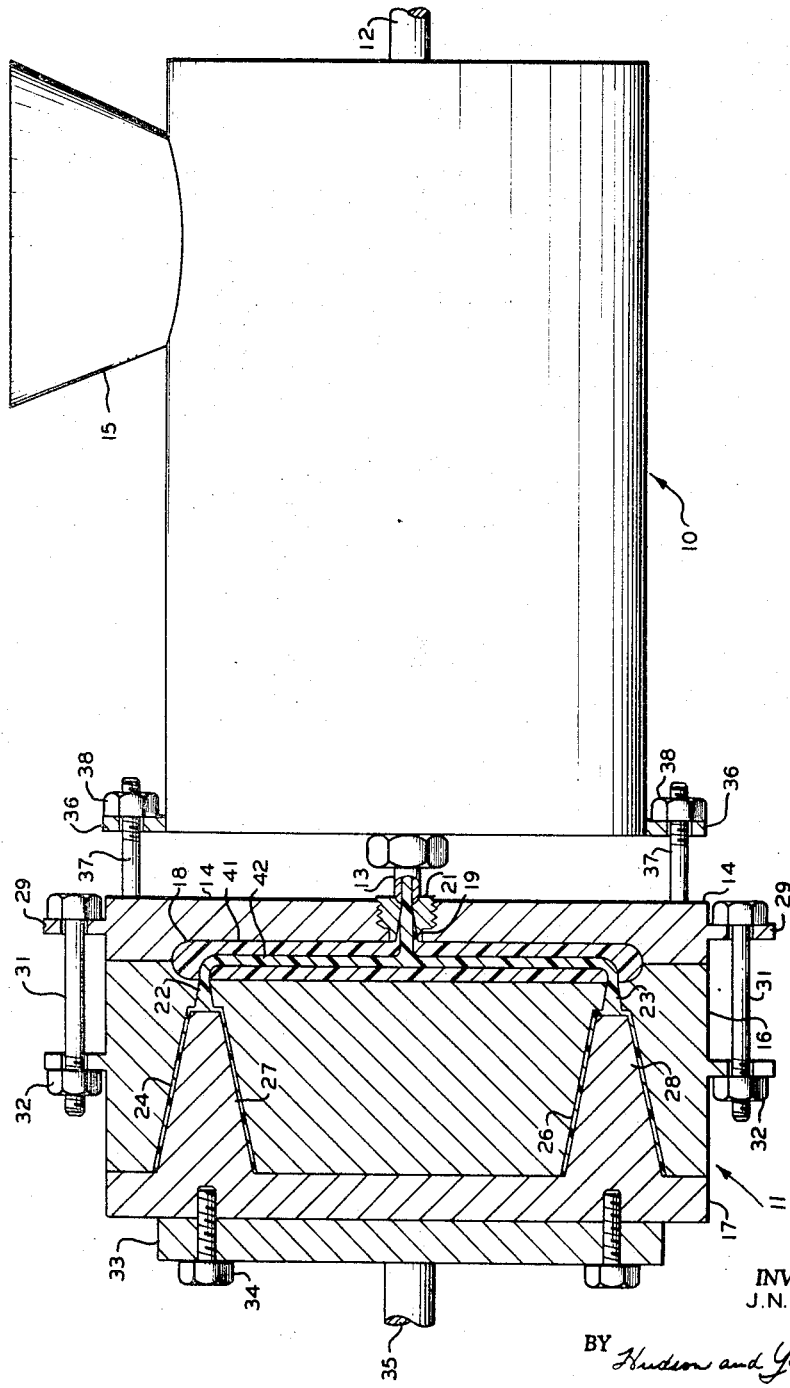
INVENTOR.
J.N. SCOTT, JR.
BY *Hudson and Young*
ATTORNEYS

United States Patent Office 3,021,568
Patented Feb. 20, 1962

3,021,568
INJECTION MOLDING OF PLASTIC MATERIALS
John N. Scott, Jr., Bartlesville, Okla., assignor to Phillips
Petroleum Company, a corporation of Delaware
Filed Oct. 15, 1958, Ser. No. 767,309
2 Claims. (Cl. 18—55)

This invention relates to the injection molding of thermoplastic material. In one aspect, it relates to injection molding apparatus having associated therewith a mold which includes a novel runner system. In another aspect, it relates to a method for the injection molding of thermoplastic materials.

Conventional molding apparatus of the injection type usually includes an injection or heating cylinder which includes an injection plunger or cylinder. The injection plunger reciprocates in the bore of the heating cylinder in such a manner as to permit the solid plastic material to be molded to enter the cylinder on the withdrawal stroke of the plunger. On the compression stroke of the plunger, the plastic material, now in a molten state, is forced from the heating cylinder through a nozzle and thence through a runner system into the mold cavities.

The two types of molds generally used in injection molding apparatus are commonly designed as 3-plate molds and hot runner molds. Both of these types have very definite disadvantages, the elimination of which is made possible by the present invention. While of the two types of molds the 3-plate mold is considerably less expensive to construct, its cold runner system freezes off during each cycle of operation, i.e., upon the completion of each shot the plastic material solidifies in the runner system. As a result, the solidified material must be removed from the runner system before proceeding with the next shot. Therefore, with 3-plate molds, cycle times are comparatively long, materials are wasted, and any attempt to control the operation automatically is greatly complicated.

As compared to the 3-plate mold, a hot runner mold is very expensive to construct. Also, several hours are often required to line out the apparatus on a stable cycle because of temperature equilibrium difficulties encountered in balancing the mold gate cooling against the runner heat. Additional problems present in a hot runner mold operation arise because of the frequent occurrence of hot spots in the mold, which cause warpage and gate brittleness of the molded article. However, in spite of these disadvantages, hot runner systems are often preferred, particularly where the production of quantity items is involved. This is the case because somewhat faster cycle times and an appreciable saving in material are obtainable with a hot runner system, and the system is also more readily adapted to automatic cycle control. In accordance with the present invention, an injection molding apparatus is provided having a mold which incorporates the advantages without any of the disadvantages of the two commonly used types of molds.

It is an object of this invention to provide an improved injection molding apparatus.

Another object of the invention is to provide an injection molding apparatus having an unheated mold which includes a runner system in which plastic materials remain molten between cycles of operation.

A further object of the invention is to provide a mold having a runner system, which does not require heating devices as do hot runner systems in order to maintain the plastic material in a molten state during operation of an injection molding machine.

A still further object of the invention is to provide an improved method for the injection molding of thermoplastic materials.

Other and further objects and advantages of the invention will become apparent to those skilled in the art upon consideration of the accompanying disclosure.

The present invention is concerned with an improved apparatus and method for the injection molding of plastic materials. In injection molding apparatus comprising a heating means, means for discharging molten plastic material under pressure from the heating means and a mold, the invention broadly resides in the improvement which comprises a first sprue formed in the mold; a runner formed in the mold, the first sprue communicating the runner with the discharge means, and the runner having a diameter such that an insulating coating of solid plastic material is formed on said runners during operation of the apparatus; and at least one other sprue formed in mold and communicating the runner with a cavity of the mold. It has been discovered that by employing a runner having a diameter such as described above, it is possible to maintain plastic material in a molten state in the runner without the provision of special heating devices. This type of operation is to be compared with a 3-plate system, which also utilizes no heating devices, in which the plastic material solidifies at the end of each cycle of operation.

In another embodiment of the invention, in a method for forming articles by the injection molding of plastic materials which comprises the steps of heating the plastic material until it is in a molten condition, forcing the molten plastic material through a sprue passageway into a runner passageway of an unheated mold and thence from the runner passageway through at least one other sprue passageway into a mold cavity, the invention resides in the improvement of initially forming on the walls of the runner passageway a solid insulating coating of plastic material. It has been found that the provision of the solid insulating coating on the runner passageway makes it possible to maintain the plastic material in the runner passageway in a molten condition between cycles without furnishing any outside source of heat to the passageway.

The materials which are molded in accordance with the present invention can be broadly defined as being thermoplastic synthetic resins. The invention is particularly applicable to materials which can be defined as high density, highly crystalline solid polymers, although low density, low crystallinity polymers can also be employed. The high density, highly crystalline solid polymers often have an inherent viscosity of at least 0.8, preferably an inherent viscosity between 1.2 and about 10, as determined from a solution of 0.2 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The crystallinity can also be determined according to the methods of Matthews, Peiser and Richards, Acta Crystallographica, 2, 85 (1949). The softening point of the polymer will vary with the particular polymer used, increasing as the density and crystallinity of the polymer increases. Generally, the softening point of the high density solid polymer is about 250° F., preferably in the approximate range of 250 to 300° F., and is several degrees higher, e.g., about 10° F., than the melting point of the polymer.

Highly crystalline polymers having the above described properties are preferably produced by the method described in U.S. Patent 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including 6 carbon atoms per molecule, such as propylene, 1-butene, and 1-pentene.

While it is preferred to use in the practice of this invention polymers produced in accordance with the Hogan and Banks process, it is to be understood that polymers produced by other methods can also be employed. For example, a polymer which can be advantageously used can be produced by contacting an olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a group IV metal, such as titanium tetrachloride. Although it is usually preferred to utilize the above-mentioned polymers, it is to be realized that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

A more complete understanding of the invention can be obtained by referring to the drawing which is an elevational view, partly in section, illustrating the injection molding apparatus of this invuention.

As illustrated in the drawing, the injection molding apparatus includes two principal components, namely, heating or injection cylinder 10 and mold 11. The solid plastic material, usually in granular form, is introduced into heating cylinder 10 through hopper 15. The heating cylinder includes a heating means for converting the solid plastic material to a molten condition. A plunger 12 reciprocates in the bore of the heating cylinder, thereby providing means for discharging the molten material through nozzle 13. Heating cylinder plunger 12 is usually connected to a hydraulic system (not shown) which provides means for moving the plunger in the bore of the heating chamber. It is to be understood that it is not intended to limit the present invention to a heating chamber of any particular construction, since any suitable heating chamber can be employed.

Mold 11 comprises three principal components which for convenience of description are designated as runner section 14, cavity section 16 and core section 17. These three sections correspond to the plates from which a 3-plate mold derives its name. Identical grooves or channels are formed in adjacent surfaces of the runner and cavity sections. When the runner and cavity sections are placed together as shown in the drawing, these grooves coincide and form runner or passageway 18. The particular runner illustrated is in the shape of a straight tube having hemispherical ends. However, it is to be understood that runners having configurations other than a straight tube come within the scope of this invention. For example, it is within the purview of the invention to employ a runner which is in the form of a circular tube.

Connecting the discharge opening in nozzle 13 to runner 18 is sprue or passageway 19. While sprue 19 is shown as being formed in insert member 21 which is threaded into runner section 14, it is to be realized that the runner section can be so machined that the sprue is an integral part of that section. Sprues 22 and 23 formed in cavity section 16 connect the runner with the space between the walls of cavities 24 and 26 and the surfaces of cores 27 and 28. The sprue openings into these spaces are usually termed the mold gates. While the mold is illustrated as including a cavity section having two cavities, it is to be understood that the invention is applicable to a mold having any desired number of cavities. It is to be noted that each of the sprues has a cross section of increasing diameter in the direction of flow of molten plastic material to provide for a desired pressure drop.

The mold of the injection molding apparatus includes means whereby the runner, cavity and core sections can be maintained securely in position with respect to one another as well as with relation to heating chamber 10. Thus, the runner and cavity sections are provided on either side with a projecting member 29. Bolts 31 having nuts 32 threaded on their ends extend through these projecting members so that runner section 14 and cavity section 16 can be locked securely together. It is to be understood that any suitable clamping device can be used to hold these two sections in position. A plate 33 is attached to core section 17 by means of bolts 34 which pass through the plate and threadedly engage the core section. Connected to plate 33 is a connecting rod 35 having at its other end a hydraulic piston which rides in a hydraulic cylinder (not shown). By means of this latter arrangement of apparatus, the core section is maintained in position against the cavity section during a cycle of operation. Upon completion of a shot, the core section is withdrawn by means of the hydraulic system so that the molded article can be removed from the cores.

Heating chamber 10 is also provided with projecting members 36 having openings therein in which bolts 37 ride. One end of these bolts is fixedly attached, as by welding, to the exposed surface of runner section 14 while the other end is threaded to receive nuts 38. By this arrangement of apparatus, the mold is maintained in position with respect to the heating chamber with the discharge end of nozzle 13 in communication with sprue 19.

In the operation of conventional 3-plate molds, the molten material after each shot freezes in the runner of the mold. Before the next cycle of operation can be commenced, it is necessary to separate the runner and cavity sections in order that the solidified material can be removed from the runner system. It has now been discovered that by enlarging the diameter of the runner, the plastic material remains molten in the runner system between cycles, rendering it unnecessary to resort to the time consuming expedient of disassembling the mold. Thus, in accordance with the present invention, the runner has a diameter such that an insulating coating of solid plastic material is formed on the runner during operation of the apparatus. Runner 18 usually has a diameter of at least ⅜ inch, preferably a diameter in the range of ½ to 2 inches and more desirably a diameter in the range of ½ to 1 inch. The smallest diameter of sprue 19, which connects the passage through nozzle 13 to runner 18, is ordinarily about ¼ inch. It is generally desired that the diameter of the runner be at least two times the length of this smallest sprue diameter.

When operating the injection molding apparatus of this invention, molten plastic material is forced from heating chamber 10 by plunger 12, the material leaving the chamber through the discharge opening of nozzle 13. On leaving nozzle 13, the molten material flows through sprue 19 and thereafter enters runner 18. The molten material completely fills runner 18 and then passes through sprues 22 and 23 into the spaces between the walls of cavities 24 and 26 and the surfaces of cores 27 and 28. The walls of the cavities are cold as are the surfaces of the cores so that the molten material rapidly solidifies to the shape of the cores. It is within the contemplation of the invention to provide channels in the cavity and core sections through which a coolant is circulated in order to provide for adequate cooling.

In the start up operation with a cold mold, a layer or coating 41 of the material being molded freezes on the runner surfaces. However, the innermost portion 42 of the runner remains open because of the insulating effect of the coating of solid material on the walls of the enlarged runner. On succeeding shots, a small amount of solid insulating material may continue to deposit on the coating originally formed after which a state of equilibrium is reached and the thickness of the insulating material stabilizes and remains constant. At this point, the temperature gradient across a cross section of the runner has reached a state of equilibrium, and the thickness of the solid insulating coating and the diameter of the molten inner portion of the runner reach an equilibrium relationship. It is to be noted that a thin coating of solidified polymer may also form on a portion of sprue 19. The presence of the solid insulating material in the runner in effect converts the mold to a hot runner mold since the plastic material to be molded remains molten between each cycle of operation. As a result, runner section 14 and cavity section 16 can be bolted securely together during the entire operation. Upon completion of the operation, or at such other times as it may be desired to shut down the apparatus, the runner and cavity sections are separated so as to remove the now solidified material from runner 18. These two sections can thereafter be bolted together, and the apparatus is now in condition to be operated in a continuous manner as described hereinbefore. It is to be understood that upon the completion of each cycle of operation, the core section is separated from the cavity section by the hydraulically actuated movement of plate 33 so that the molded article can be removed from the core surfaces. The molded article has a sprue (solid polymer corresponding to the shape of sprues 22 and 23) attached thereto which can be readily removed by a suitable cutting operation. The molded article can be of any desired shape corresponding to the configuration of the core, such as tumblers, food trays, containers, and the like.

A more comprehensive understanding of the invention can be obtained by referring to the following illustrative examples which are not intended, however, to be unduly limitative of the invention.

Example I

A 2-cavity, 3-plate mold was used in this experiment in conjunction wtih a 12-ounce injection molding press. This mold was originally designed to part in two places with the specimens being ejected at one mold parting and the solidified material formed in the runner system having to be forcibly removed from the other mold parting. In order to eliminate the time consuming task of removing the solidified material from the runner after each shot, this conventional 3-plate mold was modified by increasing the diameter of the runner from an original ¼" to ½" which quadrupled the mass of the polymer capacity of the runner. The enlarged diameter of the runner was at least two times that of the sprue connecting the discharge opening of the nozzle with the runner. The runner section and the cavity section were then locked together, and the mold was operated as a 2-plate mold.

During the start up operation with a cold mold, a coating of the high density, highly crystalline polyethylene used in the experiment formed on the runner walls. However, the inner portion of the runner did not freeze off between cycles because of the excellent insulating properties of the polyethylene coating formed on the enlarged runner system. The mold as a result operated as effectively as a hot runner system but without the thermal problems and without the expense of the more complex system. A limitless number of shots could be made with the apparatus without resorting to the cumbersome operation of removing the solidified material from the runner as is necessary with a conventional 3-plate mold upon the completion of each cycle of operation. However, it was found that excessively long cycles, e.g., 72 seconds or longer, could not be employed, for the runner would then freeze up. By using the mold with the enlarged runner, it was possible to reduce the cycle time from the 30 seconds necessary with the conventional 3-plate mold to 19 seconds. Furthermore, it was possible to establish a normal cycle during the first few shots whereas with hot runner systems several hours are sometimes required before the molds are balanced out.

Example II

An experiment was conducted with injection molding apparatus having a mold with a runner of enlarged diameter as described in Example I in which two differently colored polymers of ethylene were employed during the operation. In the initial shots, a white polymer was used while a colored polymer was used in succeeding shots. During the entire operation, the colored polymer remained in a molten state in the runner which was coated with the white polymer. After the operation was completed, the runner and cavity sections were separated, and the polymer, now in solid form and conforming to the shape of the runner, was removed. This solidified material was cut along its long axis so that a longitudinal cross section thereof could be examined. It was wound upon examination that the outer portion of the solidified material was formed of the white polymer which was frozen during the initial shots. The inner portion of the longitudinal cross section was formed of colored polymer which during the operation of the apparatus remained in a molten condition. As mentioned in conjunction with Example I, the runner had a diameter of ½". The insulating shells of the various parts of the runner had the following approximate thicknesses:

|  | Inches |
| --- | --- |
| Main body of the runner | 0.10 |
| Sprue connecting nozzle to runner | 0.030 |
| Ends of runner | 0.44 |

The thickness of the protective insulating coating can be increased slightly by increasing the cycle time. In general, the addition of 10 seconds to the clamp time on the initial cycle adds from 15 to 30 mils to the thickness of the insulating shell of the ½" diameter runner. The insulating shell of such a runner constitutes about ⅔ of the runner volume, the remaining ⅓ being the working part of the runner in which the plastic material remains molten. This portion of the runner is approximately 9 percent of the specimen volume which means that the molten material in the runner is displaced 11 times during each injection cycle.

Each specimen recovered during the above-described operation by separating the cavity and core sections had a small sprue attached thereto. This sprue was easily cut off from each of the specimens.

The present invention has been described with relation to an operation in which the material to be molded, e.g., high density polyethylene, serves also as the insulating material formed on the runner walls. While it is usually preferred to operate in this manner, it is also within the scope of the invention to employ initially one material which forms the insulating coating after which a second thermoplastic material is used to form the molded article. For example, polyethylene can be utilized initially to form the insulating coating after which polystyrene is employed to form the articles.

From the foregoing, it is seen that the present invention provides a novel method and apparatus for the injection molding of thermoplastic materials. It will be apparent to those skilled in the art that many variations and modifications can be made in the instant invention in view of the foregoing disclosure. Such modifications and variations are believed to clearly come within the spirit and scope of the invention.

I claim:

1. In a method for forming articles by the injection molding of thermoplastic material comprising the steps of heating the plastic material until it is in a molten condition, cyclically forcing the molten plastic material through a sprue passageway into a runner passageway of an unheated mold and thence from said runner passageway through a sprue passageway into a space formed between the walls of a cavity and the surfaces of a core, and withdrawing said core at the end of each cycle of operation so that a molded article can be removed therefrom, the improvement which comprises initially forming on the walls of said runner passageway a solid insulating coating of said plastic material; continuing to cyclically force molten plastic material through said sprue passageways and said insulated runner passageway into said space; and upon completion of each cycle of operation removing a molded article from said core, said plastic material in said runner passageway remaining in a molten state between cycles.

2. A method for forming articles by the injection molding of thermoplastic materials which comprises heating said plastic material in a heating zone until it is in a molten condition; forcing said molten plastic material from said heating zone into a sprue passageway formed in an unheated mold; flowing said molten plastic material through said sprue passageway into a runner passageway formed in said mold, said runner passageway being provided with a solid insulating coating of said plastic material; passing said molten plastic material from said insulated runner passageway through another sprue formed in said mold and into a space formed between a cavity and a core of said mold; withdrawing said core from said cavity; removing a molded article from said core; and continuing the aforementioned steps in a cyclic operation, said plastic material in said runner passageway remaining in a molten condition between cycles.

References Cited in the file of this patent

UNITED STATES PATENTS

| | | |
|---|---|---|
| 2,227,263 | Knowles | Dec. 31, 1940 |
| 2,587,070 | Spillman | Feb. 26, 1952 |
| 2,604,662 | Bodkin | July 29, 1952 |
| 2,865,050 | Strauss | Dec. 23, 1958 |
| 2,878,515 | Strauss | Mar. 24, 1959 |